(12) United States Patent
Cai et al.

(10) Patent No.: US 11,636,752 B2
(45) Date of Patent: Apr. 25, 2023

(54) MONITORING MACHINE OPERATION WITH DIFFERENT SENSOR TYPES TO IDENTIFY TYPICAL OPERATION FOR DERIVATION OF A SIGNATURE

(71) Applicant: Rockwell Automation Technologies, Inc., Mayfield Heights, OH (US)

(72) Inventors: Yongyao Cai, Malden, MA (US); Suresh R. Nair, Nashua, NH (US); Lee A. Lane, Medford, MA (US); Brian J. Taylor, Boston, MA (US); Burt Sacherski, Nashua, NH (US); Ashley M. Killian, Eastlake, OH (US); Kevin Zomchek, Nashua, NH (US); Michelle L. Poublon, Nashua, NH (US); Linxi Gao, Reading, MA (US); Timothy P. Wolfe, Medford, MA (US); Rebecca R. Jaeger, Somerville, MA (US); Wayne R. Foster, Tyngsborough, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 39 days.

(21) Appl. No.: 17/240,806

(22) Filed: Apr. 26, 2021

(65) Prior Publication Data

US 2022/0343748 A1 Oct. 27, 2022

(51) Int. Cl.
*G08B 21/18* (2006.01)
*G06N 20/00* (2019.01)
*G05B 15/02* (2006.01)

(52) U.S. Cl.
CPC .......... *G08B 21/182* (2013.01); *G05B 15/02* (2013.01); *G06N 20/00* (2019.01)

(58) Field of Classification Search
CPC ....... G08B 21/182; G06N 20/00; G05B 15/02
(Continued)

(56) References Cited

U.S. PATENT DOCUMENTS 10,981,315 B2 * 4/2021 Asaoka .................. G06N 3/045
11,334,063 B2 * 5/2022 Cella ..................... G01M 13/028
(Continued)

FOREIGN PATENT DOCUMENTS

EP         3401749 A1      11/2018
EP         3702863 A1       9/2020

OTHER PUBLICATIONS

EPO, European Application No. 22169999.4, Extended European Search Report, dated Sep. 9, 2022, pp. 1-8.

*Primary Examiner* — Zhen Y Wu
(74) *Attorney, Agent, or Firm* — Kunzler Bean & Adamson; Bruce R. Needham

(57) ABSTRACT

A method for derivation of a machine signature includes receiving sensor information from a primary sensor, where the primary sensor is positioned to receive information from a portion of an industrial operation, and receiving sensor information from one or more secondary sensors. The secondary sensors are arranged to provide additional information about the industrial operation indicative of current operating conditions of the industrial operation. The method includes using the sensor information from the secondary sensors and machine learning to determine if the portion of the industrial operation is operating in a normal condition and, in response to determining that the portion of the industrial operation is operating normally, using sensor information from the primary sensor during the normal operating condition to derive a primary sensor signature for the sensor information from the primary sensor.

18 Claims, 7 Drawing Sheets

(58) Field of Classification Search
USPC .......................................................... 340/679
See application file for complete search history.

(56) References Cited

U.S. PATENT DOCUMENTS

| | | | | |
|---|---|---|---|---|
| 11,555,757 B2* | 1/2023 | Saburi | ................... | G01M 7/025 |
| 2005/0146302 A1* | 7/2005 | Kamio | ..................... | G05B 9/03 |
| | | | | 318/647 |
| 2009/0300417 A1* | 12/2009 | Bonissone | ......... | G05B 23/0254 |
| | | | | 714/E11.178 |
| 2011/0234236 A1* | 9/2011 | Godel | ................ | G05B 23/0235 |
| | | | | 324/537 |
| 2011/0316699 A1* | 12/2011 | Arunachalam | .... | G01N 33/0006 |
| | | | | 340/540 |
| 2012/0022762 A1* | 1/2012 | Rosero | ................... | F02B 77/08 |
| | | | | 701/101 |
| 2013/0173218 A1* | 7/2013 | Maeda | ................ | G05B 23/0224 |
| | | | | 702/182 |
| 2016/0048399 A1* | 2/2016 | Shaw | ....................... | G01D 1/18 |
| | | | | 718/1 |
| 2016/0330225 A1* | 11/2016 | Kroyzer | ................. | G06N 20/00 |
| 2017/0024649 A1* | 1/2017 | Yan | ........................ | G06N 3/045 |
| 2018/0135455 A1* | 5/2018 | Khibnik | ............... | F01D 21/003 |
| 2018/0281256 A1* | 10/2018 | Asaoka | ..................... | G06N 3/08 |
| 2018/0297718 A1* | 10/2018 | Adibhatla | .............. | G07C 5/006 |
| 2018/0306609 A1* | 10/2018 | Agarwal | .................. | H04L 67/12 |
| 2018/0330557 A1* | 11/2018 | Rivera | ................. | G07C 5/0816 |
| 2019/0033171 A1* | 1/2019 | Zhang | ..................... | F02D 41/22 |
| 2019/0118443 A1* | 4/2019 | Asaoka | .............. | G05B 23/0235 |
| 2019/0171199 A1* | 6/2019 | Unuma | .................. | G01M 99/00 |
| 2019/0265657 A1* | 8/2019 | Inagaki | ................. | G05B 23/024 |
| 2019/0325328 A1* | 10/2019 | Katz | ........................ | G06F 17/14 |
| 2020/0103878 A1* | 4/2020 | SayyarRodsari | .......................... | G05B 19/41885 |
| 2020/0110393 A1* | 4/2020 | Kumano | ........... | G05B 19/0428 |
| 2020/0130246 A1* | 4/2020 | Horiuchi | ............. | G06F 18/2414 |
| 2020/0151967 A1* | 5/2020 | Boggio | ................. | G07C 5/0808 |
| 2020/0254670 A1* | 8/2020 | Horiuchi | .................. | G06N 3/08 |
| 2020/0271544 A1* | 8/2020 | Saburi | .................... | G01H 1/003 |
| 2020/0371491 A1* | 11/2020 | Wong | .................. | G05B 19/406 |
| 2021/0190638 A1* | 6/2021 | Augustyniak | ........ | G07C 5/0816 |
| 2022/0058481 A1* | 2/2022 | Odagaki | ................ | G01M 13/021 |
| 2022/0121192 A1* | 4/2022 | Nagano | ................... | F01D 25/00 |

* cited by examiner

MONITORING MACHINE OPERATION WITH DIFFERENT SENSOR TYPES TO IDENTIFY TYPICAL OPERATION FOR DERIVATION OF A SIGNATURE

BACKGROUND INFORMATION

The subject matter disclosed herein relates to using sensor data to derive a sensor signature of sensor monitoring a machine and more specifically relates to using multiple sensor types to identify a normal operating condition for derivation of a sensor signature of a sensor monitoring a machine to use for identifying abnormal conditions.

BRIEF DESCRIPTION

A method for using multiple sensor types to identify a normal operating condition for derivation of a primary sensor signature is disclosed. An apparatus and a system also perform the functions of the apparatus. The method includes receiving sensor information from a primary sensor, where the primary sensor is positioned to receive information from a portion of an industrial operation, and includes receiving sensor information from one or more secondary sensors. The one or more secondary sensors are arranged to provide additional information about the portion of the industrial operation monitored by the primary sensor indicative of current operating conditions of the portion of the industrial operation. The method includes using the sensor information from the one or more secondary sensors and a machine learning algorithm to determine if the portion of the industrial operation is operating in a normal or abnormal condition and, in response to determining that the portion of the industrial operation is operating in a normal condition, using sensor information from the primary sensor during the determined normal operating condition to derive a primary sensor signature for the sensor information from the primary sensor.

A component for using multiple sensor types to identify a normal operating condition for derivation of a primary sensor signature includes a primary sensor module configured to receive sensor information from a primary sensor. The primary sensor is positioned to receive information from a portion of an industrial operation. The component includes a secondary sensor module configured to receive sensor information from one or more secondary sensors. The one or more secondary sensors are arranged to provide additional information about the portion of the industrial operation monitored by the primary sensor indicative of current operating conditions of the portion of the industrial operation. The component includes a conditions module configured to use the sensor information from the one or more secondary sensors and a machine learning algorithm to determine if the portion of the industrial operation is operating in a normal or abnormal condition. The component includes a signature module configured to, in response to determining that the portion of the industrial operation is operating in a normal condition, use sensor information from the primary sensor during the determined normal operating condition to derive a primary sensor signature for the sensor information from the primary sensor. The modules include hardware circuits, a programmable hardware device, and/or executable code. The executable code is stored on one or more computer readable storage media.

A computer program product for using multiple sensor types to identify a normal operating condition for derivation of a primary sensor signature includes a computer readable storage medium having program code embodied therein. The program code is executable by a processor to receive sensor information from a primary sensor, where the primary sensor is positioned to receive information from a portion of an industrial operation, and receive sensor information from one or more secondary sensors. The one or more secondary sensors are arranged to provide additional information about the portion of the industrial operation monitored by the primary sensor indicative of current operating conditions of the portion of the industrial operation. The program code is executable by a processor to use the sensor information from the one or more secondary sensors and a machine learning algorithm to determine if the portion of the industrial operation is operating in a normal or abnormal condition and, in response to determining that the portion of the industrial operation is operating in a normal condition, use sensor information from the primary sensor during the determined normal operating condition to derive a primary sensor signature for the sensor information from the primary sensor.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
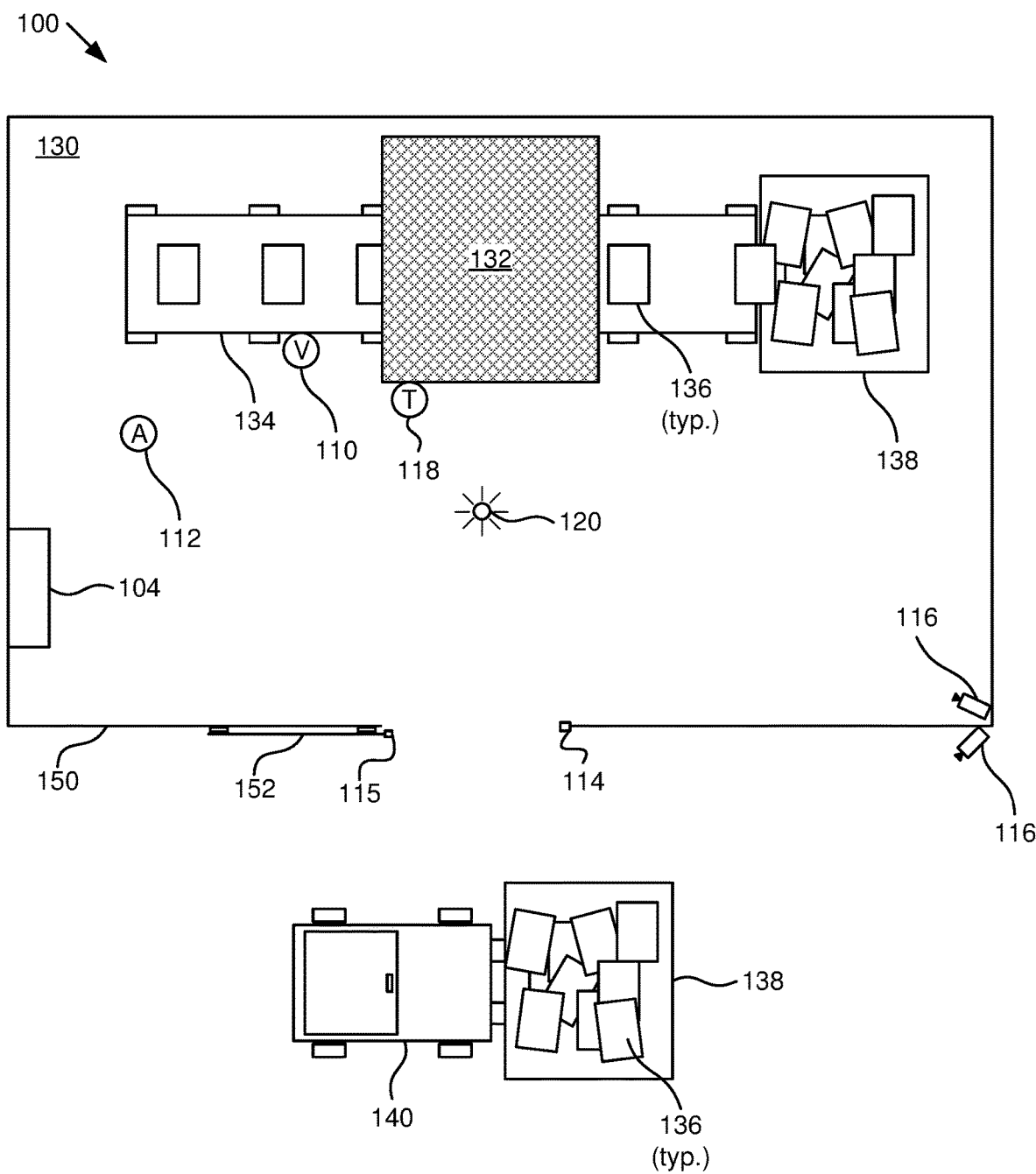
FIG. 1A is a top view of a schematic block diagram of a portion of an industrial operation with a system for using multiple sensor types to identify a normal operating condition for derivation of a primary sensor signature.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible, non-transitory medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Python, Ruby, R, Java, Java Script, Smalltalk, C++, C sharp, Lisp, Clojure, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program product may be shared, simultaneously serving multiple customers in a flexible, automated fashion.

The computer program product may be integrated into a client, server and network environment by providing for the computer program product to coexist with applications, operating systems and network operating systems software and then installing the computer program product on the clients and servers in the environment where the computer program product will function. In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time. The embodiments may securely communicate encrypted data. The embodiments may organize data for efficient validation. In addition, the embodiments may validate the data in response to an action and/or a lack of an action.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

A method for using multiple sensor types to identify a normal operating condition for derivation of a primary sensor signature is disclosed. An apparatus and a system also perform the functions of the apparatus. The method includes receiving sensor information from a primary sensor, where the primary sensor is positioned to receive information from a portion of an industrial operation, and includes receiving sensor information from one or more secondary sensors. The one or more secondary sensors are arranged to provide additional information about the portion of the industrial operation monitored by the primary sensor indicative of current operating conditions of the portion of the industrial operation. The method includes using the sensor information from the one or more secondary sensors and a machine learning algorithm to determine if the portion of the industrial operation is operating in a normal or abnormal condition and, in response to determining that the portion of the industrial operation is operating in a normal condition, using sensor information from the primary sensor during the determined normal operating condition to derive a primary sensor signature for the sensor information from the primary sensor.

In some embodiments, the method includes receiving additional sensor information from a primary sensor positioned to receive information from a portion of an industrial operation at least similar to the portion of the industrial operation used to derive the primary sensor signature, determining if the additional sensor information exceeds the primary sensor signature by a threshold amount, and sending an alert in response to determining that the additional sensor information exceeds the primary sensor signature by the threshold amount. In other embodiments, the primary sensor signature includes frequency information and determining if the additional sensor information exceeds the primary sensor signature by a threshold amount includes determining if the additional sensor information at a frequency exceeds the primary sensor signature at the frequency by the threshold amount. In other embodiments, the portion of the industrial operation at least similar to the portion of the industrial operation used to derive the primary sensor signature is the portion of the industrial operation used to derive the primary sensor signature and the primary sensor used to receive the additional sensor information is the primary sensor used to derive the primary sensor signature.

In some embodiments, the information from the primary sensor includes a repeating pattern. In other embodiments, the method includes receiving sensor information from the one or more secondary sensors indicative of a change to operation of the portion of the industrial operation monitored by the primary sensor where the change to the operation is an additional normal operating condition. The embodiments include receiving additional sensor information from the primary sensor during the additional normal operating condition, and using the additional sensor information from the primary sensor during the determined additional normal operating condition and using the machine learning algorithm to derive an additional primary sensor signature for the sensor information from the primary sensor without sending an alert of an abnormal operating condition. In other embodiments, the machine learning algorithm updates the primary sensor signature in response to receiving additional sensor information from the primary sensor and receiving additional sensor information from the one or more secondary sensors and/or receiving sensor information from a primary sensor and receiving sensor information from one or more secondary sensors positioned to receive information from a portion of an industrial operation at least similar to the portion of the industrial operation used to derive the primary sensor signature.

In some embodiments, the method includes using the sensor information from the one or more secondary sensors to identify a transient condition and excluding sensor information of the primary sensor during the transient condition. In other embodiments, the primary sensor is one of a vibration sensor, an acoustic sensor, a pressure sensor and a flow sensor. In other embodiments, a secondary sensor of the one or more secondary sensors is one of a temperature sensor, a current sensor, a voltage sensor, a camera, a motion sensor, a vibration sensor, an acoustic sensor, a pressure sensor, a flow sensor and information from a programmable logic controller ("PLC"). In some embodiments, one or more of the secondary sensors are of a different type than the primary sensor. In other embodiments, one or more of the secondary sensors perform a different function than the primary sensor. In other embodiments, one or more of the secondary sensors are a virtual sensor that include a sensing function based on sensor information from two or more other sensors.

A component for using multiple sensor types to identify a normal operating condition for derivation of a primary sensor signature includes a primary sensor module configured to receive sensor information from a primary sensor. The primary sensor is positioned to receive information from a portion of an industrial operation. The component includes a secondary sensor module configured to receive sensor information from one or more secondary sensors. The one or more secondary sensors are arranged to provide additional information about the portion of the industrial operation monitored by the primary sensor indicative of current operating conditions of the portion of the industrial operation. The component includes a conditions module configured to use the sensor information from the one or more secondary sensors and a machine learning algorithm to determine if the portion of the industrial operation is operating in a normal or abnormal condition. The component includes a signature module configured to, in response to determining that the portion of the industrial operation is operating in a normal condition, use sensor information from the primary sensor during the determined normal operating condition to derive a primary sensor signature for the sensor information from the primary sensor. The modules include hardware circuits, a programmable hardware device, and/or executable code. The executable code is stored on one or more computer readable storage media.

In some embodiments, the component includes an operations module configured to receive additional sensor information from a primary sensor positioned to receive information from a portion of an industrial operation at least similar to the portion of the industrial operation used to derive the primary sensor signature, a violation module configured to determine if the additional sensor information exceeds the primary sensor signature by a threshold amount, and an alert module configured to send an alert in response to determining that the additional sensor information exceeds the primary sensor signature by the threshold amount. In other embodiments, the information from the primary sensor includes a repeating pattern. In other embodiments, the secondary sensor module is further configured to receive sensor information from the one or more secondary sensors indicative of a change to operation of the portion of the industrial operation monitored by the primary sensor where the change to the operation is an additional normal operating condition, the primary sensor module is configured to receive additional sensor information from the primary sensor during the additional normal operating condition, and a new signature module is configured to use the additional sensor information from the primary sensor during the determined additional normal operating condition and use the machine learning algorithm to derive an additional primary sensor signature for the sensor information from the primary sensor without sending an alert of an abnormal operating condition.

In some embodiments, the component includes a transient exclusion module configured to use the sensor information from the one or more secondary sensors to identify a transient condition and the signature module is configured to exclude sensor information of the primary sensor during the transient condition. In other embodiments, the primary sensor is one of a vibration sensor, an acoustic sensor, a pressure sensor and a flow sensor. In other embodiments, a secondary sensor of the one or more secondary sensors is one of a temperature sensor, a current sensor, a voltage sensor, a camera, a motion sensor, a vibration sensor, an acoustic sensor, a pressure sensor, a flow sensor and information from a programmable logic controller ("PLC").

A computer program product for using multiple sensor types to identify a normal operating condition for derivation of a primary sensor signature includes a computer readable storage medium having program code embodied therein. The program code is executable by a processor to receive sensor information from a primary sensor, where the primary sensor is positioned to receive information from a portion of an industrial operation, and receive sensor information from one or more secondary sensors. The one or more secondary sensors are arranged to provide additional information about the portion of the industrial operation monitored by the primary sensor indicative of current operating conditions of the portion of the industrial operation. The program code is executable by a processor to use the sensor information from the one or more secondary sensors and a machine learning algorithm to determine if the portion of the industrial operation is operating in a normal or abnormal condition and, in response to determining that the portion of the industrial operation is operating in a normal condition, use sensor information from the primary sensor during the determined normal operating condition to derive a primary sensor signature for the sensor information from the primary sensor.

In some embodiments, the program code is further configured to receive additional sensor information from a primary sensor positioned to receive information from a portion of an industrial operation at least similar to the portion of the industrial operation used to derive the primary sensor signature, determine if the additional sensor information exceeds the primary sensor signature by a threshold amount, and send an alert in response to determining that the additional sensor information exceeds the primary sensor signature by the threshold amount. In other embodiments, the information from the primary sensor includes a repeating pattern. In other embodiments, the program code is further configured to receive information from the one or more secondary sensors indicative of a change to operation of the portion of the industrial operation during where the change to the operation comprises an additional normal operating condition, receive additional sensor information from the primary sensor during the additional normal operating condition, and use the additional sensor information from the primary sensor during the determined additional normal operating condition and use the machine learning algorithm to derive an additional primary sensor signature for the sensor information from the primary sensor without sending an alert of an abnormal operating condition.

Figure 1B:
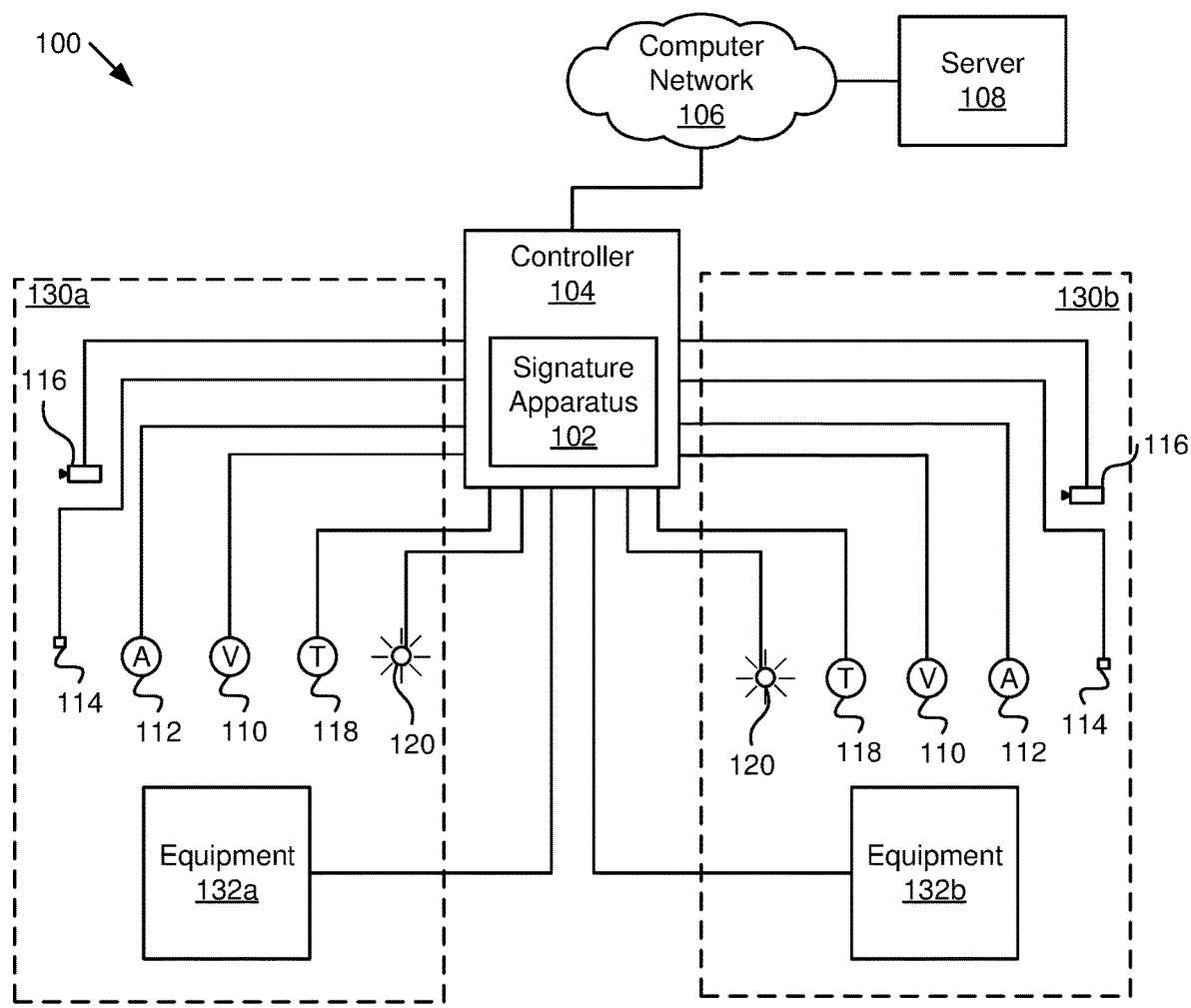
FIG. 1B is a schematic block diagram of the system of FIG. 1A for using multiple sensor types to identify a normal operating condition for derivation of a primary sensor signature.

FIG. 1A is a top view of a schematic block diagram of a portion of an industrial operation with a system 100 for using multiple sensor types to identify a normal operating condition for derivation of a primary sensor signature. FIG. 1B is a schematic block diagram of the system 100 of FIG. 1A for using multiple sensor types to identify a normal operating condition for derivation of a primary sensor signature. The system 100 includes a signature apparatus 102 in a controller 104, a computer network 106, a server 108, a vibration sensor 110, an acoustic sensor 112, a radio-frequency identifier ("RFID") sensor 114, an RFID tag 115, a camera 116, a temperature sensor 118, a 3-dimensional ("3D") motion sensor 120, a portion of an industrial operation 130, a machine 132, a conveyor 134, a product 136 being manufactured or produced, a bin 138, a forklift 140, an enclosure 150, and a gate 152, which are described in more detail below.

FIG. 1A depicts at least a portion of an industrial operation 130 with a conveyor 134 moving products 136 through a machine 132, and then to a bin 138. The industrial operation 130 depicted is surrounded by an enclosure 150 with a gate 152 where the controller 104 is mounted on the enclosure 150. In other embodiments, the controller 104 is mounted elsewhere. A forklift 140 is moving past the enclosure 150 while carrying a bin 138 with product 136. Various sensors 110, 112, 114, 116, 118, 120 are positioned as primary and secondary sensors. The industrial operation 130 of FIG. 1A is merely an illustration to be used as an example. The signature apparatus 102 is applicable to other industrial operations 130 with other equipment that may include numerous pieces of equipment or may be applied to a very simple industrial operation 130. In some embodiments, sensor information from sensors 110, 112, 114, 116, 118, 120 from one piece of equipment (e.g. 132, 134) may be used as secondary sensor information to derive a primary sensor signature for primary sensors of another piece of nearby equipment, and vice versa.

The signature apparatus 102 is configured to use sensor data from a primary sensor and secondary sensors and a machine learning algorithm to identify normal operating conditions and then to use sensor information from the primary sensor during the normal operating condition to derive a primary sensor signature. The signature apparatus 102 also uses the derived signature and additional primary sensor information to identify abnormal conditions. The signature apparatus 102 uses the machine learning algorithm and secondary sensor information to differentiate between abnormal conditions and normal conditions. For example, the secondary sensors may identify that a forklift 140 is passing by, which may cause the primary sensor, which may be a vibration sensor 110, to pick up additional vibrations that should not be included in a signature for the primary sensor. In another example, the secondary sensors, such as input from a programmable logic controller ("PLC") indicating a change in speed for a machine, may cause vibrations outside of a steady-state condition present during normal operations or may cause vibrations of a particular frequency indicative of a speed change.

In addition, the machine learning algorithm is capable, in some embodiments, of identifying rhythmic or repeating patterns that may be part of normal operations. For example, the industrial operation being monitored may include a bottle filling machine and as bottles pass down a conveyor belt 134 into the filling machine, vibration patterns may increase and decrease in a consistent pattern, but different from steady state. Typical monitoring systems sense steady state and are often not able to identify normal operations that include repeating patterns. The machine learning algorithm is capable of identifying from the primary and secondary sensor information that the pattern present at the primary sensor that includes variations over time are indeed part of normal operations. The secondary sensors are used by the signature apparatus 102 and the machine learning algorithm to sense conditions that would indicate normal operations and abnormal operations.

The machine learning algorithm may be trained to identify conditions consistent with normal conditions and abnormal conditions and may correlate data from primary and secondary sensors. For example, a camera 116 may track movement of a forklift 140 while a primary sensor that is a vibration sensor 110 measures vibrations caused by a machine 132 and caused by the forklift 140. The machine learning algorithm may correlate distance between the forklift 140 and the machine 132 with changes in vibration and may determine a distance that the forklift 140 is away from the machine 132 before vibrations from the forklift 140 are negligible. The machine learning algorithm can be trained over time to identify various conditions and transients and their effect on a primary sensor so that the signature apparatus 102 is able to identify periods of operating under normal and abnormal conditions.

Derivation of a primary sensor signature for a particular location and/or machine may include supervised machine learning or unsupervised machine learning. Supervised machine learning includes input from a person. For example, a person could provide input indicating that a normal operation is occurring. Supervised machine learning has its place, but a system that derives signature information indicative of normal operations without human input is desirable. An objective of the signature apparatus 102 is to provide unsupervised machine learning through the use of secondary sensor information and a machine learning algorithm capable of determining normal operations, even when rhythmic patterns exist and capable of identifying conditions, situations, etc. that are indicative of abnormal operations so that data during abnormal operations can be excluded while deriving a primary sensor signature for a location and/or machine. The signature apparatus 102 is explained in more detail below.

In some embodiments, the signature apparatus 102 is located in a controller 104. The controller 104, in some embodiments, operates machinery 132, 134. In some embodiments, the controller 104 is a PLC. In other embodiments, the controller 104 is a drive for a motor. In other embodiments, the controller 104 is a higher level device that provide higher level instructions to lower level controllers. In some embodiments, the controller 104 includes one or more processors, memory, has access or includes data storage, and has other components of a computing device. In other embodiments, the controller 104 includes a programmable hardware device, such as a FPGA. In other embodiments, the controller 104 includes hardware circuits. In some embodiments, the signature apparatus 102 is located in a computing device separate from the controller 104. One of skill in the art will recognize other forms of a controller 104 or other computing devices that may include a signature apparatus 102.

The system 100 includes a computer network 106 and a server 108. The server 108 may be used to process data, provide high level control information to the controller 104, may be used by a system administrator, or other typical uses. In some embodiments, the server 108 and/or controller 104 may be connected to one or more clients, input/output devices, electronic displays, and the like.

The computer network 106 may be wired, wireless or a combination of both. The computer network 106 may include a local area network ("LAN"), a wide area network ("WAN"), a fiber optic network, a proprietary network, the Internet, a wireless connection, and/or the like. The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT-F® connection as defined by Dynastream® Innovations Inc. of Cochrane, Canada. The wireless connection may be an infrared connection including connections conforming at least to the Infrared Physical Layer Specification ("IrPHY") as defined by the Infrared Data Association® ("IrDA"®). Alternatively, the wireless connection may include a cellular telephone network communication. All standards and/or connection types include the latest version and revision of the standard and/or connection type as of the filing date of this application.

The system 100 includes various sensors 110, 112, 114, 116, 118, 120 with a connection to the controller 104. In some embodiments, a portion or all of the sensors 110, 112, 114, 116, 118, 120 connect to one or more condition monitoring systems or machine safety systems (not shown) of some type and a relay, network interface, controller, etc. provides sensor information from the sensors 110, 112, 114, 116, 118, 120 to the controller 104 and signature apparatus 102. For example, a condition monitoring system may be a Dynamix™ 1444 integrated condition monitoring system from Allen-Bradley®. In other embodiments, the condition monitoring system is a GuardLink® condition monitoring/machine safety system from Allen-Bradley®. Other embodiments include other condition monitoring systems to connect to sensors and provide sensor information to the controller 104. One of skill in the art will recognize other systems that receive input from one or more sensors 110, 112, 114, 116, 118, 120 and provide sensor information to the controller 104 and/or signature apparatus 102.

The system 100 includes, in some embodiments, one or more vibration sensors 110 are located in and monitor vibrations on one or pieces of equipment (e.g. 132*a*, 132*b*

(collectively or generically "132"), 134) of an industrial operation 130. In some embodiments, the vibration sensors 110 are primary sensors. In other embodiments, other types of sensors are the primary sensors, such as acoustic sensors, flow sensors, pressure sensors, and the like.

The vibration sensors 110, in some embodiments, are positioned to detect vibration in bearings, bearing races, belts, gears, and the like, to detect cavitation in a pump or other potential sources of vibration. In other embodiments, the external condition monitoring system includes acoustic sensors 112 to detect sound caused by vibration or other problem noises. One of skill in the art will recognize other equipment and locations in the industrial operation 130 to monitor with a vibration sensor 110, acoustic sensors, etc.

In some embodiments, the vibration sensors 110 are accelerometers. The accelerometers are mounted to detect vibration of a particular part of a machine 132, 134 or other equipment, and mountings of the sensors 110 may be a magnetic mounting, an epoxied mounting or a stud mounting where the type of mounting may be selected based on a desired frequency range of the accelerometers. In some embodiments, the sensors 110 are piezoelectric sensors, such as integrated circuit piezoelectric ("ICP") industrial accelerators. In some embodiments, the sensors 110 are dual output sensors, which may measure two parameters such as vibration and temperature. In some embodiments, a sensor 110 may be an eddy current probe for vibration measurement on machines 132, 134 with fluid film bearings. In some embodiments, sensors 110 are selected based on expected frequencies used for analysis. For example, some sensors 110 may be selected to measure maximum frequencies ("FMAX") up to about 2 kilo hertz ("kHz") or 5 kHz. Other sensors 110 may sense frequencies up to 40 kHz and beyond when measuring spike energy. One of skill in the art will recognize other suitable vibration sensors 110.

In some embodiments, the system 100 includes one or more acoustic sensors 112. In some embodiments, the acoustic sensors 112 are mounted to detect sound correlated to vibration. In such embodiments, the acoustic sensors 112 may be primary sensors. In other embodiments, the acoustic sensors 112 are positioned to detect sound associated with other conditions. For example, an acoustic sensor 112 may detect a human voice, which may be used by the signature apparatus 102 to determine that a person is near an industrial operation 130 being monitored. The acoustic sensors 112 may also sense other conditions, such as a forklift 140, a machine starting, a bottle moving through a machine 132, etc., which may be used by the signature apparatus 102 for secondary sensor information, to identify normal and abnormal conditions, and the like.

The system 100, in some embodiments, includes an RFID sensor 114 and an RFID tag 115, which may be used on a non-contact switch to detect an open or a closed position of a gate, a door, a window, a panel, and the like. In other embodiments, the RFID sensor 114 is part of a locking device capable of locking a gate, door, panel, etc. In FIG. 1A, the RFID sensor 114 is located at a post of a gate 152 of an enclosure 150. The enclosure 150 surrounds equipment 132, 134 of the industrial operation 130. The RFID tag 115, in FIG. 1A, is located on the gate 152 so that when the gate 152 is open, the RFID sensor 114 will not sense the RFID tag 115 the RFID sensor 114 may signal an open state for the gate 152. When the RFID sensor 114 senses the RFID tag 115, for example, after an open state, the RFID sensor 114 may then signal a closed state for the gate 152. An open state for the gate 152 may indicate that a person, a forklift 140, a pallet jack, etc. are entering or exiting the enclosure 150.

Information from the RFID sensor 114 may be used by the signature apparatus 102 to indicate a normal or abnormal condition. In other embodiments, information from other sensors (e.g. 120, 116, 112) may be used in conjunction with information from the RFID sensor 114 to identify a normal or abnormal condition.

In some embodiments, the system 100 includes one or more cameras 116. The cameras 116, in some embodiments, are secondary sensors used to determine if equipment 132, 134 is operating in a normal condition or not. For example, information from a camera 116 may be used to detect if a person is near equipment 132, 134, if a forklift 140, pallet jack, etc. is moving past the equipment 132, 134, etc. Information from the camera 116 may also be used to determine if the equipment 132, 134 is having a problem. For example, product 136 on a conveyor 134 may be misaligned, may be tipped over, may be stuck in a machine 132, etc. and information from a camera 116 may detect this abnormal condition. In some embodiments, the signature apparatus 102 may use sensor information from a camera 116 in conjunction with sensor information from another primary or secondary sensor 110, 112, 114, 118, 120 to determine if a normal or abnormal condition exists. For example, sensor information from a camera 116 may be used together with sensor information from the RFID sensor 114 to determine if a person is entering or exiting the enclosure 150.

In some embodiments, the system 100 includes a temperature sensor 118. The temperature sensor 118, in some embodiments, is a secondary sensor used to provide information to the signature apparatus 102 to determine if a machine (e.g. 132) is operating during a normal or abnormal condition. For example, a temperature spike sensed by the temperature sensor 118 may indicate an abnormal condition. Alternatively, a temperature increase sensed by the temperature sensor 118 may indicate a normal operating condition, for example, if a machine 132 has an increased load. Information about the increased load may come from another sensor or from the controller 104, such as a command to increase machine throughput. In some embodiments, the temperature sensor 118 is a primary sensor and the signature apparatus 102 determines a primary sensor signature for the temperature sensor 118 while a machine 132 being sensed by the temperature sensor 118 is operating during a normal condition.

In some embodiments, the system 100 includes a motion sensor 120. In some embodiments, the motion sensor 120 detects any type of motion within a range. The motion sensor may be ultrasonic, infrared, or the like. In other embodiments, the motion sensor 120 is a three-dimensional ("3D") motion sensor that tracks location, direction of movement, velocity, etc. The motion sensor 120, in some embodiments, is a secondary sensor used to provide information to the signature apparatus 102 to determine if a machine (e.g. 132) is operating during a normal or abnormal condition. For example, the motion sensor 120 may be used to detect motion of a person or piece of equipment 132, 134, such as a forklift 140, near the equipment 132, 134. As with the cameras 116, in some embodiments, the signature apparatus 102 may use sensor information from the motion sensor 120 in conjunction with sensor information from another primary or secondary sensor 110, 112, 114, 118, 120 to determine if a normal or abnormal condition exists. For example, sensor information from the motion sensor 120 may be used together with sensor information from the RFID sensor 114 to determine if a person is entering or exiting the enclosure 150.

FIG. 1B depicts two portions 130a, 130b of an industrial operation 130 where each portion 130a, 130b includes sensors 110, 112, 114, 116, 118, 120 and a piece of equipment 132a, 132b monitored by the sensors 110, 112, 114, 116, 118, 120. The controller 104, in some embodiments, receives information from the sensors 110, 112, 114, 116, 118, 120 of both portions 130a, 130b of the industrial operation 130. In other embodiments, additional equipment is monitored by additional sensors 110, 112, 114, 116, 118, 120, which provide information to the controller 104. In other embodiments, the system 100 includes additional controllers 104 and the signature apparatus 102 is split between the controllers 104 or the additional controllers 104 transmit information a signature apparatus 102 in one controller 104. In other embodiments, the signature apparatus 102 is located elsewhere, such as in the server 108. One of skill in the art will recognize other configurations of the system 100 and locations for all or a portion of the signature apparatus 102.

Figure 2:
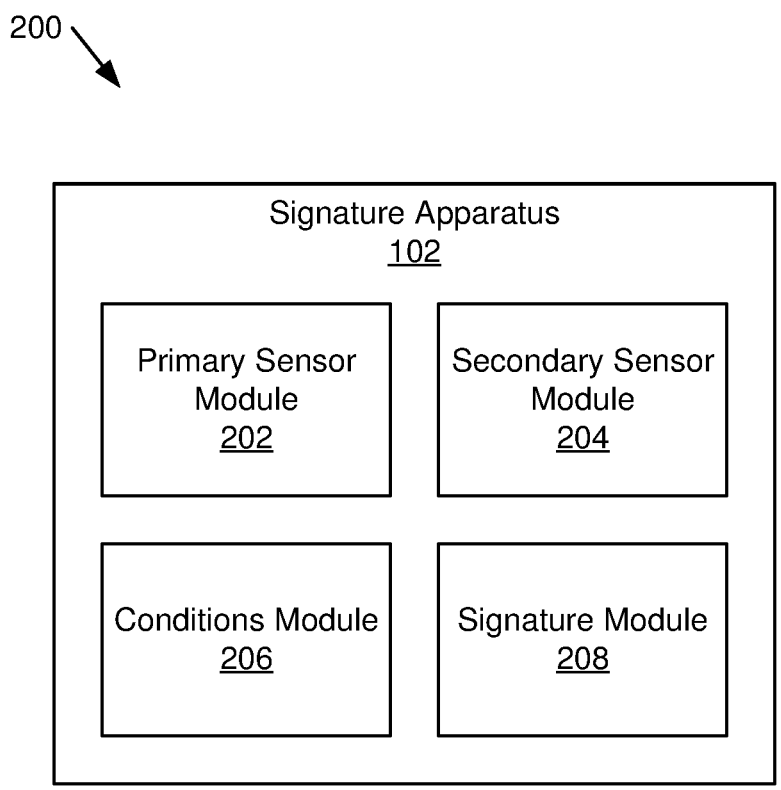
FIG. 2 is a schematic block diagram of one embodiment of a signature apparatus for using multiple sensor types to identify a normal operating condition for derivation of a primary sensor signature.

FIG. 2 is a schematic block diagram of one embodiment of an apparatus 200 for using multiple sensor types to identify a normal operating condition for derivation of a primary sensor signature. The apparatus 200 includes one embodiment of the signature apparatus 102 with a primary sensor module 202, a secondary sensor module 204, a conditions module 206 and a signature module 208, which are described below.

The apparatus 200 includes a primary sensor module 202 configured to receive sensor information from a primary sensor. The primary sensor is positioned to receive information from a portion of an industrial operation 130. In one example, the primary sensor is a vibration sensor 110. In other embodiments, the primary sensor is an acoustic sensor 112, a pressure sensor, a flow sensor or the like. The primary sensor is positioned, in some embodiments, to monitor a particular machine (e.g. 132) of the industrial operation 130. For example, if the machine 132 includes a motor, a vibration sensor 110 operating as a primary sensor may be positioned on the motor to monitor a bearing, to monitor a motor housing, etc. In other embodiments, the primary sensor is mounted in a pipe, mounted near equipment, etc. and is able to monitor equipment 132, 134. In some embodiments, the primary sensor module 202 receives the sensor information directly from the primary sensor. In other embodiments, the primary sensor module 202 receives sensor information from a condition monitoring system, from a controller, from a drive, etc.

The apparatus 200 includes a secondary sensor module 204 configured to receive sensor information from one or more secondary sensors. One or more of the secondary sensors, in some embodiments, are of a different type than the primary sensor and are arranged to provide additional information about the portion of the industrial operation 130 monitored by the primary sensor and indicative of current operating conditions of the portion of the industrial operation 130. In some examples, the one or more secondary sensors may include a temperature sensor 118, a current sensor, a voltage sensor, a camera 116, a three-dimensional motion sensor 120, a vibration sensor 110, an acoustic sensor 112, a pressure sensor, a flow sensor, information from a PLC, and the like.

In other embodiments, one or more of the secondary sensors perform a different function than the primary sensor. For example, the primary sensor may be an acoustic sensor that senses vibration while another sensor is also an acoustic sensor and is configured to sense other types of sounds, such as footsteps, voices, machinery moving by, etc. In other embodiments, the primary sensor and one or more secondary sensors are located within a same housing. For example, a housing with a vibration sensor may also have a temperature sensor included.

In some embodiments, one or more of the secondary sensors is a virtual sensor that includes a sensing function based on sensor information from two or more other sensors. For example, sensor information from a camera 116, a motion sensor 120 and/or an acoustic sensor 112 may be combined for a virtual sensor that determines if a person or machine is close to the first machine 132. One of skill in the art will recognize other types and functions of a secondary sensor.

While in some embodiments the one or more secondary sensors are of a different type than the primary sensor, in other embodiments one or more of the secondary sensors are of the same type as the primary sensors. For example, a primary sensor may be a vibration sensor 110 that may monitor a first machine 132 and a secondary sensor may also be a vibration sensor 110 located on a second machine (e.g. 134 or not shown) located nearby. In the example, vibrations from the second machine may affect the vibrations at the primary sensor (e.g. 110) of the first machine 132. The second machine may experience a startup, a transient, etc. and the secondary sensor that is a vibration sensor 110 on the second machine may then pick up the vibrations of the startup, transient, etc. and vibration effects on the primary sensor from the second machine may be discounted, may be deemed abnormal, etc. for the purposes of deriving a primary sensor signature.

Typically, the sensor information received by the secondary sensor module 204 is useful to determine that the portion of the industrial process 130 monitored by the primary sensor is operating in a normal condition or an abnormal condition. For example, a secondary sensor that is a camera 116 or 3D motion sensor 120 may detect a forklift 140 driving by, may detect a person at a machine (e.g. 132) monitored by the primary sensor, may detect an increase in current, a rise in temperature, or other indicator of an abnormal condition.

The apparatus 200 includes a conditions module 206 configured to use the sensor information from the one or more secondary sensors and a machine learning algorithm to determine if the portion of the industrial operation 130 is operating in a normal or abnormal condition. For example, the primary sensor may be a vibration sensor 110 and secondary sensors (e.g. 112, 114, 116, 118, 120 and information from a PLC) may not detect any conditions that would affect operations, may not detect a transient condition, may not detect a command causing a change, etc. so the conditions module 206 may then determine that a normal condition exists for operations at the portion of the industrial operation 130 being monitored by the primary sensor.

Where the sensor information from the secondary sensors detect conditions indicative of an abnormal condition, the conditions module 206 is configured to determine that the portion of the industrial operation 130 monitored by the primary sensor is operating in an abnormal condition. For example, a camera 116 or 3D motion sensor 120 may detect movement of a person or machine that would affect the primary sensor so the conditions module 206 may then determine that the portion of the industrial operation 130 monitored by the primary sensor is operating in an abnormal condition. The machine learning algorithm, in some embodiments, correlates sensor data and sensor information patterns over time to help distinguish between normal conditions and abnormal conditions.

In some embodiments, the conditions module 206 determines whether or not sensor information from the one or more secondary sensors is within normal limits for the secondary sensors. For example, the portion of the industrial operation 130 monitored by the primary sensor may be experiencing a repeating pattern. Where the primary sensor is a vibration sensor 110, the repeating pattern may be variations in vibration magnitude. A motor operating a conveyor 134 may have a secondary sensor that is a current sensor where the secondary sensor module 204 may determine that motor current is within normal limits, even though the motor may be surging as material moves along the conveyor 134. Information from a PLC may indicate normal operation. Temperature information from the temperature sensor 118 may be within normal limits. Thus, the machine learning algorithm of the conditions module 206 may determine that the portion of the industrial process 130 monitored by the primary sensor is operating in a normal condition. In other embodiments, the machine learning algorithm identifies one or more secondary sensors indicating sensor information beyond normal limits and the conditions module 206 may indicate an abnormal condition.

In other embodiments, the conditions module 206 also uses information from the primary sensor to determine that the portion of the industrial operation 130 being monitored by the primary sensor is operating in a normal condition. For example, the machine learning algorithm may determine that sensor information from the primary sensor is consistent with previously received sensor information and may use this sensor information from the primary sensor in addition to information from the secondary sensors to determine if the portion of the industrial operation 130 is operating in a normal or abnormal condition.

The apparatus 200 includes a signature module 208 configured to, in response to the conditions module 206 determining that the portion of the industrial operation 130 monitored by the primary sensor is operating in a normal condition, use sensor information from the primary sensor during the determined normal operating condition to derive a primary sensor signature for the sensor information from the primary sensor. For example, where the conditions module 206 receives secondary sensor information that is indicative of people and machines not causing vibrations or disruption, sensor information from current and voltage sensors of steady-state operation or a repeating pattern, and the like, the conditions module 206 may send a notification or other message to the signature module 208 of a normal condition for the portion of the industrial process 130 being monitored by the primary sensor so the signature module 208 starts to determine a primary sensor signature for the primary sensor.

In some embodiments, when the conditions module 206 starts to detect a transient, a startup condition, a forklift 140 driving by, etc., the conditions module 206 then sends a message indicating an abnormal condition and the signature module 208 ignores sensor information from the primary sensor until the conditions module 206 then sends a message indicating a resumption of normal conditions. In some embodiments, the signature module 208 determines a primary sensor signature using a particular amount of sensor information, which may or may not be continuous sensor information.

A primary sensor signature, in some embodiments, includes sensor information captured during a normal condition of the portion of the industrial operation 130 monitored by the primary sensor. The primary sensor signature, in some embodiments, includes an amplitude. For example, where the primary sensor is a vibration sensor 110, the primary sensor signature includes a vibration amplitude experienced during normal conditions. In some embodiments, the amplitude is a maximum amplitude. In other embodiments, the amplitude is an average amplitude. In some embodiments, the signature module 208 includes filtering to filter out noise, spikes, etc. that would artificially increase an amplitude. For example, the filter may be a low pass filter. The low pass filter, in some embodiments, is designed to include repetitive patterns in the sensor information.

In some embodiments, the primary sensor signature includes frequency information. The primary sensor module 202, in some embodiments, receives sensor information from the primary sensor for a particular time period where the time period provides enough vibration data to analyze the measured vibration information. In one example, the primary sensor module 202 receives sensor information for a time period sufficient for a frequency analysis on the sensor information. In some examples, the time period is sufficient for a Fast Fourier Transform ("FFT") analysis. In other embodiments, the time period is sufficient for other analyses. In other embodiments, the primary sensor module 202 receives sensor information at a particular sampling rate sufficient for an intended frequency range.

In some embodiments, the primary sensor module 202 includes various filters. For example, a channel of the primary sensor module 202 connected to a primary sensor, such as a vibration sensor 110 may use a low pass filter on measured vibration information to filter out frequencies above a maximum frequency ("FMAX"). FMAX, in some embodiments, is 2 kHz, but may be higher or lower. In some embodiments, vibration information below about 2 kHz may capture vibrations for machine speeds around 60 Hz and below. Where a machine (e.g. 132) is running at 3600 revolutions-per-minute ("rpm"), which corresponds to 60 Hz, energy from various bearings and other machine parts may vibrate at multiples of 60 Hz so that and may be below about 2 kHz. In other embodiments, an available FMAX may be 5 kHz.

In other embodiments, the primary sensor module 202 includes one or more high pass filters used to measure frequencies higher than those passed by the low pass filters. Often, vibration information at frequencies higher than about 2 kHz have magnitudes much less than vibration information below about 2 kHz and would be drowned out without a high pass filter. Typically, a primary sensor has one or more natural resonant frequencies. For a motor and a primary sensor that is a vibration sensor 110, rotation of bearings, rotor spin, etc. may cause vibration energy at the natural resonant frequencies. Other primary sensor types may include a similar phenomenon. Energy measured around the natural frequencies of a primary sensor, in some embodiments, is called spike energy with units of gSE (spike energy acceleration). Just as striking a tuning fork causes the tuning fork to ring louder, rough bearings or other faults may cause more spike energy in terms of higher amplitudes at the natural resonant frequencies of the primary sensor, and increased spike energy may be used to predict some impeding faults.

Figure 3:
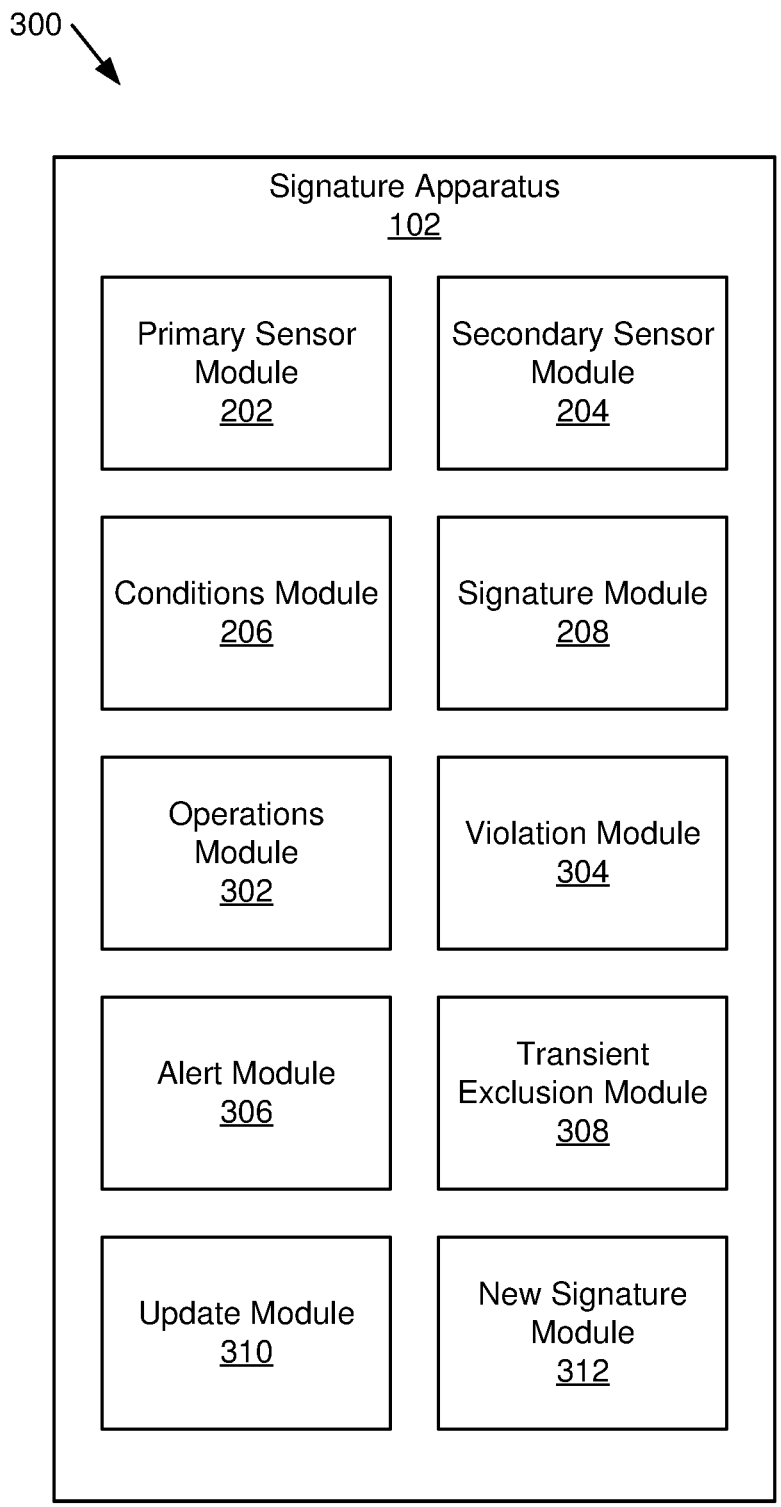
FIG. 3 is a schematic block diagram of another embodiment of a signature apparatus for using multiple sensor types to identify a normal operating condition for derivation of a primary sensor signature.

FIG. 3 is a schematic block diagram of another embodiment of an apparatus 300 for using multiple sensor types to identify a normal operating condition for derivation of a primary sensor signature. The apparatus 300 includes another embodiment of the signature apparatus 102 with a primary sensor module 202, a secondary sensor module 204, a conditions module 206 and a signature module 208, which are substantially similar to those described above in relationship to the apparatus 200 of FIG. 2. The signature apparatus 300, in various embodiments, includes an operations module 302, a violation module 304, an alert module 306, a transient exclusion module 308, an update module 310, and a new signature module 312, which are described below.

The apparatus 300, in some embodiments, includes an operations module 302 configured to receive additional sensor information from a primary sensor positioned to receive information from a portion of an industrial operation at least similar to the portion of the industrial operation 130 used to derive the primary sensor signature. In some embodiments, the portion of the industrial operation 130 used to derive the primary sensor signature is the same portion of the industrial operation 130 with a primary sensor that provides the additional sensor information. In another embodiment, the portion of the industrial operation 130 used to derive the primary sensor signature is different than the portion of the industrial operation 130 with a primary sensor that provides the additional sensor information.

For example, the primary sensor signature may be derived from a primary sensor for a particular type of equipment, such as a conveyor transporting bottles. The two bottle conveyors may be sufficiently similar so that the primary sensor signature derived for one bottle conveyor may then be used for a different conveyor transporting bottles. However, equipment that is similar or even identical may experience different conditions based on where the equipment is installed and, in some embodiments, a primary sensor signature from a different machine may be used for a particular primary sensor of a machine as an initial signature and may be updated with additional primary and secondary sensor information.

In the embodiment, the operations module 302 receives the additional sensor information in an operations mode when the machine (e.g. 132) being monitored by the primary sensor is operating as intended to produce a product, to move product, to service a load, etc. For example, the signature module 208 may derive a primary sensor signature during a training mode while the operations module 302 receives the additional sensor information during an operations mode. However, as explained below, the update module 310 may use additional sensor information to update the primary sensor signature.

The apparatus 300, in some embodiments, includes a violation module 304 configured to determine if the additional sensor information exceeds the primary sensor signature by a threshold amount. In some embodiments, the primary sensor signature is in the form of an amplitude and the threshold is an amount beyond the amplitude of the primary sensor signature and the violation module 304 compares an amplitude from the additional sensor information with the amplitude of the primary sensor signature plus the threshold. In other embodiments, the primary sensor signature includes frequency information and the violation module 304 converts the additional sensor information to a frequency domain, for example with a FFT, and compares the additional sensor information at various frequencies with primary sensor signature data at corresponding frequencies where for each frequency there is a particular threshold amount. The threshold amounts may be the same or different for the various frequencies.

In some embodiments, the violation module 304 uses sensor information from the secondary sensors to determine which primary sensor signature is applicable for comparison with primary sensor information. For example, the violation module 304 may use secondary sensor information to determine a particular operational condition of the portion of the industrial operation 130 monitored by the primary sensor and the, may select a primary sensor signature corresponding to the operational condition. In some embodiments the violation module 304 has various primary sensor signatures to choose from.

The apparatus 300 includes, in some embodiments, an alert module 306 configured to send an alert in response to the violation module 304 determining that the additional sensor information exceeds the primary sensor signature by the threshold amount. In some embodiments, the violation module 304 uses different threshold amounts indicative of different conditions. For example, a particular threshold amount may correspond to a developing problem, another threshold amount may correspond to a higher level problem, another threshold amount may correspond to an immanent failure, etc. Where the violation module 304 includes different thresholds, the alert module 306 sends different alerts corresponding to the different thresholds or types of violations. For example, the violation module 304 may identify a violation indicative of a problem that is developing where an expected failure is in the future so the alert module 306 sends an alert that a failure is expected in the future so that replacement parts may be ordered. For a more critical problem identified by the violation module 304, the alert module 306 will then send a different alert with an appropriate warning.

In some embodiments, the violation module 304 performs an operational frequency analysis during operation mode using vibration information measured by the operations module 302. In some embodiments, the operational frequency analysis is a Fourier analysis. A Fourier analysis is a method of converting data from a time domain to a frequency domain. A Fourier analysis is based on the idea that a waveform may deconstructed into discrete sinusoidal frequencies, each with a particular magnitude and phase shift. Often a Fourier analysis is displayed on a graph with frequencies on a horizontal axis and magnitude information on a vertical axis.

In some embodiments, the operational frequency analysis is a discrete Fourier transform ("DFT"), which uses discrete sampling to perform a Fourier transform. In other embodiments, the operational frequency analysis is an FFT, which is an algorithm to perform a DFT. An FFT is typically computationally more efficient than a DFT and produces results that are typically similar enough to a DFT to produce accurate results. In some embodiments, violation module 304 uses a sampling rate for the DFT and/or FFT based on machine speed. In some embodiments, the violation module 304 uses a sampling rate and produces results that are comparable to a primary sensor signature of a machine (e.g. 132). Note that machine 132 is used as an example and is representative of any machine in the industrial operations 130 with a primary sensor that includes a primary sensor signature.

In embodiments where the primary sensor signature is for vibration information, the violation module 304 may use vibration information units of acceleration in gravity ("g's") or g-force where acceleration is based on the earth's gravitational pull. For example, 1 g is 9.8 meters per second squared ($m/s^2$). Using units of g's, in some embodiments, is a convenient measurement for frequency analysis. In other embodiments, the violation module 304 uses vibration information in terms of velocity. However, velocity measurements may be less useful at higher frequencies. In some embodiments, vibration information measured by the operations module 302 is integrated to velocity. In other embodiments, when signals are measured at frequencies over 1 kHz, the preferred units are g's.

In some embodiments, the violation module 304 performs an operational frequency analysis to produce vibration information in the form of acceleration magnitudes at various frequencies. As will be discussed in more detail below, where the machine 132 is a rotating machine such as a motor or other rotating equipment, the vibration information may be divided into various bands where the bands are based on machine speed. In some embodiments, common faults are referenced in terms of frequency orders, 1×, 2×, and so on, where 1× is one times running speed of the machine 132. For example, 60 Hz would correspond to 3600 revolutions-per-minute ("rpm"), 50 Hz would correspond to 3000 rpm, etc. Therefore, when 1× corresponds to 60 Hz, 2× would correspond to 120 Hz.

Bearing faults and other types of faults are often expressed in multiples of machine speed (e.g. 0.5×, 1×, 2×, 3×, etc.) and certain faults are associated with a particular multiple of machine speed. Thus, a primary sensor signature for a particular machine speed, such as full speed, may include acceleration magnitudes at particular frequencies where a primary sensor signature for another machine speed for the same machine 132, such as half speed, may include different acceleration magnitudes at the same particular frequencies or even different acceleration magnitudes at different frequencies. Thus, beneficially the violation module 304 performs an operational frequency analysis, such as a FFT, on vibration data for a particular measured machine speed. Machine speed may come from secondary sensor information, for example, from a PLC, from a speed sensor, etc. While machine speed may be in terms of speed of a motor, machine speed may also be in terms of a conveyor belt speed, a production line speed, etc.

The violation module 304 that compares results from the operational frequency analysis with a primary sensor signature for the machine 132. In some embodiments, the primary sensor signature for is for a particular machine speed, loading condition, operational condition, etc. that matches the machine speed, loading condition, operational condition, etc. of the measured primary sensor information. In some embodiments, the primary sensor signature includes one of a plurality of primary sensor signatures for the machine 132 monitored by the primary sensor for different conditions. Having a different primary sensor signature for each condition is advantageous to have limits set for each condition rather than an overall primary sensor signature that might not pick up certain failure indications. For example, where the condition is a machine speed that is half of full speed for the machine 132, the corresponding primary sensor signature may have lower magnitudes at various frequencies than the same frequencies at full speed. Thus, where the machine 132 is running at half speed, a magnitude of vibrations at a particular frequency may exceed the primary sensor signature for half speed by an amount indicative of a failure where the magnitude of the vibrations may not exceed the primary sensor signature of the machine 132 at full speed. Therefore, using primary sensor signatures for various conditions allows a closer match to actual running conditions than using a single primary sensor signature for a machine 132.

The violation module 304, in some embodiments, is configured to identify a potential failure mode or problem based on a frequency range where the frequency analysis of the measured vibration information exceeds, by a particular threshold amount, the primary sensor signature that matches the particular condition. A primary sensor signature for a particular condition of the machine 132, in some embodiments, includes a frequency range where at particular frequencies the primary sensor signature has a corresponding magnitude for each of the particular frequencies and the magnitudes represent vibrations under normal operating conditions.

In some embodiments, for a particular machine speed, where a magnitude at particular frequency of the vibration information exceeds by a threshold amount a magnitude of vibrations at the same frequency in a corresponding primary sensor signature, the alert module 306 is configured to identify a potential failure mode corresponding to a particular part that is in or on the machine 132. For example, excessive vibrations at a particular frequency may indicate a start of a bearing failure where excessive vibrations at another frequency may indicate a beginning of a different type of failure, such as an inner race failure. At a different machine speed, the failures may be manifest at different frequencies.

In some embodiments, the violation module 304 uses known fault information for a known machine type and known machine part types to identify a fault or an indication of a developing fault. For example, where the machine 132 is a medium-sized electric motor, the operational frequency analysis may be split into around 8 bands where each band of frequencies may be associated with a particular type of fault. A Band 0 corresponds to bearing cage anomalies and may have a frequency range of 0.2× to 0.8× (e.g. 0.8× is 0.8 times the frequency of the machine speed), and may typically be about 15% of an overall level of vibration energy below about 2 kHz. A Band 1 corresponds to an unbalance with a frequency range of 0.8× to 1.2× and may typically be about 90% of the overall level of vibration energy below about 2 kHz. A Band 2 corresponds to misalignment or looseness with a frequency range of 1.2× to 2.2× and may typically be about 35% of the overall level of vibration energy below 2 kHz. Other bands correspond to other fault types and each machine type typically includes different bands with different frequency ranges and different amounts of vibration energy with respect to overall vibration energy.

In some embodiments, thresholds are set for each band, for each fault type, etc. based on expected energy in a particular frequency range. For example, for Band 0 above, a first threshold may be set to 0.42 millimeters per second (mm/s) and a second threshold may be set to 0.63 mm/s. For Band 1 a first threshold may be set to 2.52 mm/s and a second threshold may be set to 3.78 mm/s. In other embodiments, a primary sensor signature is based on measured vibration information at a particular machine speed and includes amplitude data for each band so that alerts are set as percentages of the measured data in the primary sensor signatures. For example, for one or more bands a first threshold may be set to 150% of the amplitude of the primary sensor signature for the machine speed that corresponds to the vibration information and a second threshold may be set to 200%. Other percentages may be chosen for a threshold to indicate a fault. Where the violation module 304 determines that an operational frequency analysis includes vibration amplitude information in a particular band (e.g. Band 0) that is at or above 150% of the vibration amplitude information in the same Band 0 for a primary sensor signature matching the machine speed of the vibration information, the violation module 304 may then determine that there is a fault of the type associated with Band 0.

In some embodiments, the violation module 304 evaluates vibration energy in the form of spike energy ("gSE") of a primary sensor that is a vibration sensor 110. Typically, spike energy is quantified as an overall spike energy (gSE overall). Spike energy is typically above the FMAX of the low pass filter. Vibration sensors 110, associated high pass filters and spike energy algorithms, in some embodiments, filter out low frequency content and then measure high frequency signals up to about 40 kHz times FMAX. In some embodiments, a gSE algorithm is optimized so that natural frequencies (resonant frequencies) are near a center of a measurement range. Where a vibration sensor 110 and the operations module 302 measures up to 40 kHz and a high pass filter is set to 5 kHz, the mid-range of the gSE algorithm is about 22.5 kHz. Two different primary sensors, even that are of the same type, may have two different resonant frequencies.

In some embodiments, measured gSE energy is difficult to quantify in terms of a threshold so there are typically no spike energy tables. The violation module 304 may then be set to identify an increase of gSE energy beyond a baseline in the corresponding primary sensor signature. The violation module 304 may include a particular amount of increase of gSE energy, such as 200%, as a threshold to indicate to the violation module 304 that there is a particular fault. For example, certain early stage bearing faults may be associated with spike energy increase.

Some types of bearing faults are ball damage ("B S F"), inner race anomaly ("BPFI"), outer race anomaly ("BPFO") and cage anomaly ("FTF"). For rolling element bearing faults, each bearing fault has a specific frequency which can be calculated by way of a formula where each formula is dependent on machine speed. Thus, having primary sensor signatures for various machine speeds and other conditions is beneficial to identify specific faults at the specific machine speeds and/or conditions.

In some embodiments, the violation module 304 uses fault progression information to identify faults that correspond to different stages of failure of a bearing or other part of a machine 132. For example, failure associated with bearings may follow five stages of failure. Stage 1 may include elevated spike energy, which may be far in advance of other indications of failure. In some embodiments, a bearing fault may be indicated by a spike energy measurement as low as 0.25 gSE overall. Stage 1 may be detected as early as 2 to 6 months ahead of bearing failure. Stage 2 may include excited bearing natural frequencies, which may be in a frequency band of around 1 kHz to 2 kHz. Consequently, when vibration elevates in this range, it can be an early indication of a bearing fault. However, depending on the machine there may be other possible causes of vibration in this range, such as gear mesh, that should be discounted before determining that the vibration is being caused by a bearing fault.

Stage 3 includes increased vibration at discrete fault frequencies, such as BSF, BPFI, BPFO and FTF. Most of the fault indicators are above 1× machine speed but one fault indicator, FTF, is typically below 1×. Stage 4 includes vibrations at the harmonic of the bearing faults BSF, BPFI, BPFO and FTF. As failure progresses, energy at both the fundamental frequencies corresponding to BSF, BPFI, BPFO and FTF and their harmonics is present. Stage 5 is where failure is imminent and discrete frequencies will disappear and are typically replaced by a broad band of noise which may grow to include the frequency at 1×. The violation module 304, in some embodiments, identifies particular faults as well as a particular stage of failure. One of skill in the art will recognize other ways for the violation module 304 to utilize differences between an operational frequency analysis for measured vibration information at a machine speed and a primary sensor signature for the same machine speed to identify particular fault types within the machine 132. While the description above with respect to FIG. 3 is for an operational mode, the frequency analysis techniques described herein are also applicable to primary sensor data used by the apparatus 200 of FIG. 2 to develop a primary sensor signature.

The apparatus 300, in some embodiments, includes a transient exclusion module 308 configured to use the sensor information from the one or more secondary sensors to identify a transient condition and the signature module 208 is configured to exclude sensor information of the primary sensor during the transient condition. For example, the secondary sensor module 204 may receive information from a PLC that a command has been issued to increase a speed of a machine (e.g. 132) monitored by a primary sensor, may receive information from a current sensor, a voltage sensor, etc. indicative of a transient. The transient exclusion module 308 identifies a transient condition and causes the signature module 208 to exclude sensor information during the transient. In other embodiments, the secondary sensor module 204 receives secondary sensor information from a camera 116, a 3D motion sensor 120, etc. of a person, a forklift 140, or other equipment near the machine 132 being monitored by the primary sensor that would produce vibrations or otherwise cause extraneous vibration, pressure, flow, etc. sensed by the primary sensor and the transient exclusion module 308 determines that a transient condition exists and causes the signature module 208 to exclude primary sensor information during the transient.

The transient exclusion module 308, in some embodiments, uses a portion of the machine learning algorithm to correlate certain conditions with a transient. For example, the machine learning algorithm may use secondary sensor information, such as current sensor information, voltage sensor information, commands from a PLC, etc. and may learn over time magnitude and time length of a transient. For example, the machine learning algorithm may correlate voltage and/or current transients with certain commands from the PLC, such as a speed increase, and the machine algorithm may then be able to indicate how long a transient is expected to exist.

In some embodiments, the transient exclusion module 308 is used during an operational mode to exclude sensor information from the primary sensor when comparing sensor information from the primary sensor with the primary sensor signature. For example, sensor information gathered during a transient condition may cause erroneous sensor information not useful in detecting a developing failure. Excluding sensor information of the primary sensor during a transient may then increase accuracy when detecting a problem with a machine 132 being monitored by the primary sensor. The violation module 304 may then exclude transient data identified by the transient exclusion module 308.

The apparatus 300 includes, in some embodiments, an update module 310 that causes the machine learning algorithm to update the primary sensor signature in response to receiving additional sensor information from the primary sensor and receiving additional sensor information from the one or more secondary sensors. In another embodiment, the update module 310 is configured to cause the machine learning algorithm to update the primary sensor signature in response to receiving sensor information from a primary sensor and receiving sensor information from one or more secondary sensors positioned to receive information from a portion of an industrial operation at least similar to the portion of the industrial operation used to derive the primary sensor signature. The update module 310, in some embodiments, relies on the conditions module 206 to indicate that the portion of the industrial operation 130 monitored by the primary sensor is operating in a normal condition and the update module 310 updates the primary sensor signature during operations during normal conditions.

The apparatus 300 includes, in some embodiments, a new signature module 312. In the embodiments, the secondary sensor module 204 is further configured to receive information from the one or more secondary sensors indicative of a change to operation of the portion of the industrial operation 130 being monitored by the primary sensor where the change to the operation is an additional normal operating condition. Also in the embodiment, the primary sensor module 202 is configured to receive additional sensor information from the primary sensor during the additional normal operating condition and the new signature module 312 is configured to use the additional sensor information from the primary sensor during the determined additional normal operating condition and use the machine learning algorithm to derive an additional primary sensor signature for the sensor information from the primary sensor without sending an alert of an abnormal operating condition.

For example, the industrial operations 130 may include filling bottles and when the signature module 208 derives a first primary sensor signature, the industrial operation 130 uses a first type of bottle spaced apart a first distance. Later, the industrial operation 130 uses a second type of bottle spaced apart a second distance. Both operations are normal operations so the conditions module 206 should determine normal conditions for both bottle types and spacings. The secondary sensor module 204, for example, may receive a command from the PLC that the bottle type and spacing are being changed so that after the change the conditions module 206 may again signal a normal condition where other factors are not present, such as forklifts 140 driving by, startups, etc. The conditions module 206 uses the machine learning algorithm and the secondary sensor information to identify times while the industrial operation 130 is using the second bottle type and second spacing that normal conditions exist. The new signature module 312 then derives the new primary sensor signature for the new normal condition. The machine learning algorithm is useful in identifying rhythmic and repeating patterns that are indicative of normal conditions and changing normal conditions.

Figure 4:
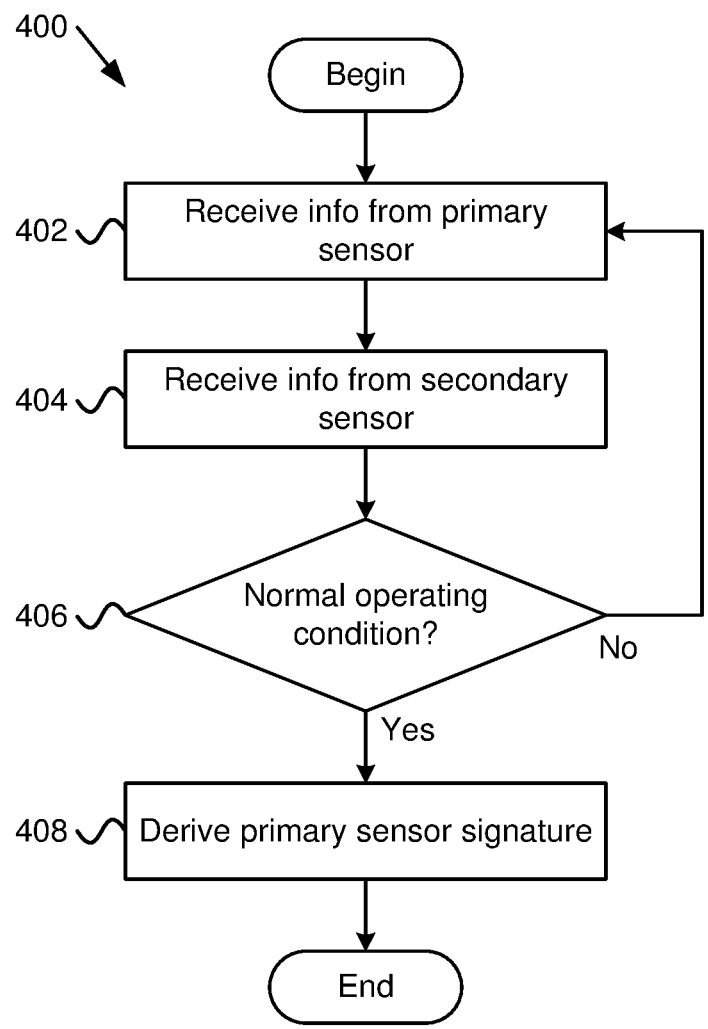
FIG. 4 is a schematic flowchart diagram of one embodiment of a method for using multiple sensor types to identify a normal operating condition for derivation of a primary sensor signature.

FIG. 4 is a schematic flowchart diagram of one embodiment of a method 400 for using multiple sensor types to identify a normal operating condition for derivation of a primary sensor signature. The method 400 begins and receives 402 sensor information from a primary sensor where the primary sensor is positioned to receive information from a portion of an industrial operation 130. The method 400 receives 404 sensor information from one or more secondary sensors. One or more of the secondary sensors are arranged to provide additional information about the portion of the industrial operation 130 monitored by the primary sensor indicative of current operating conditions of the portion of the industrial operation 130.

The method 400 determines 406 if the portion of the industrial operation 130 is operating in a normal condition using the sensor information from the one or more secondary sensors and a machine learning algorithm. If the method 400 determines 406 that the portion of the industrial operation 130 is operating in a normal condition, the method 400 derives 408 a primary sensor signature for the sensor information from the primary sensor using sensor information from the primary sensor during the determined normal operating condition, and the method 400 ends. If the method 400 determines 406 that the portion of the industrial operation 130 is not operating in a normal condition (e.g. abnormal condition), the method 400 returns and receives 402 sensor information from the primary sensor and receives 404 sensor information from the secondary sensors. In various embodiments, the steps of the method 400 are implemented using one or more of the primary sensor module 202, the secondary sensor module 204, the conditions module 206 and the signature module 208.

Figure 5A:
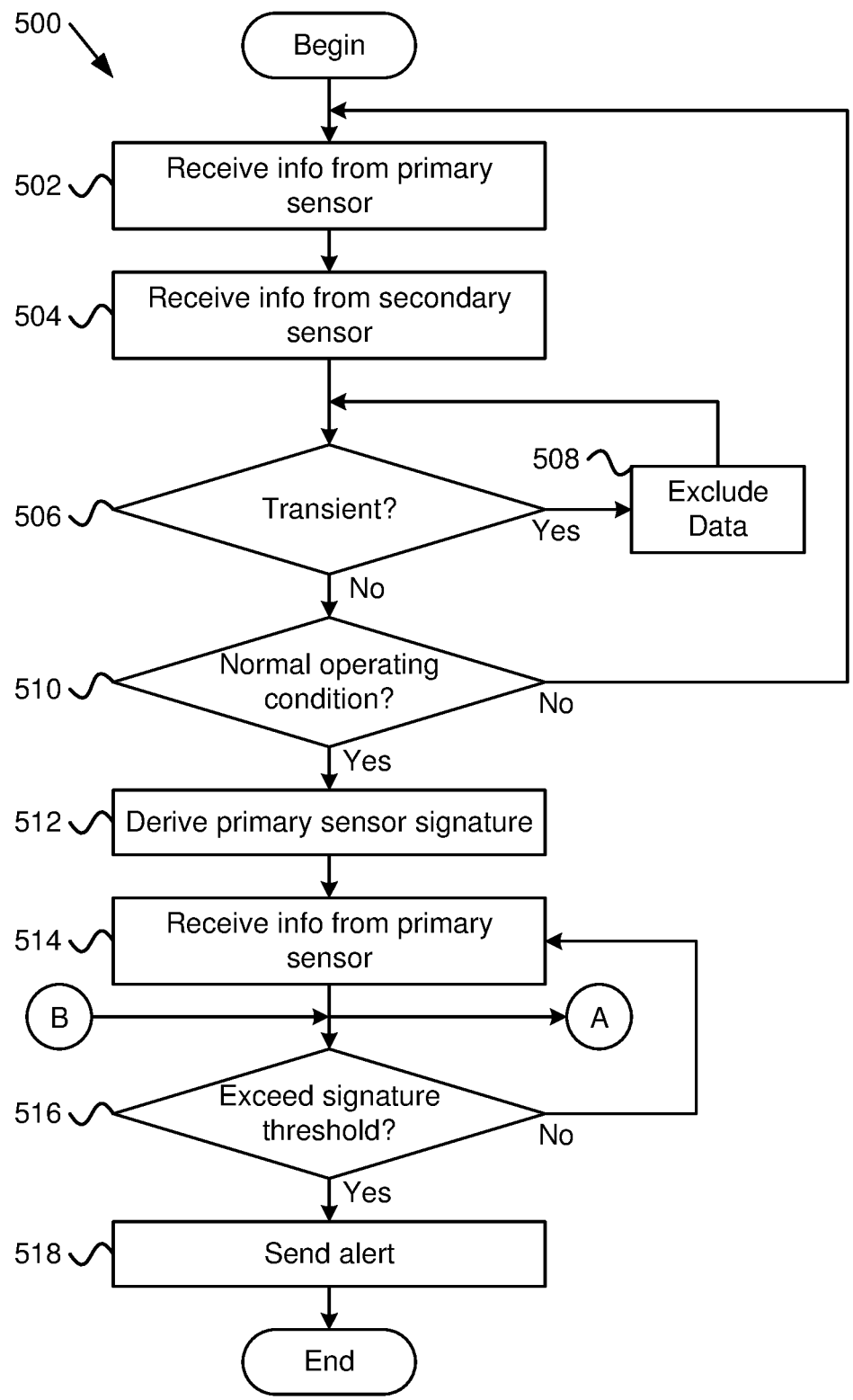
FIG. 5A is a first part of a schematic flowchart diagram of one embodiment of a method for using multiple sensor types to identify a normal operating condition for derivation of a primary sensor signature and using the signature to identify abnormal conditions.
Figure 5B:
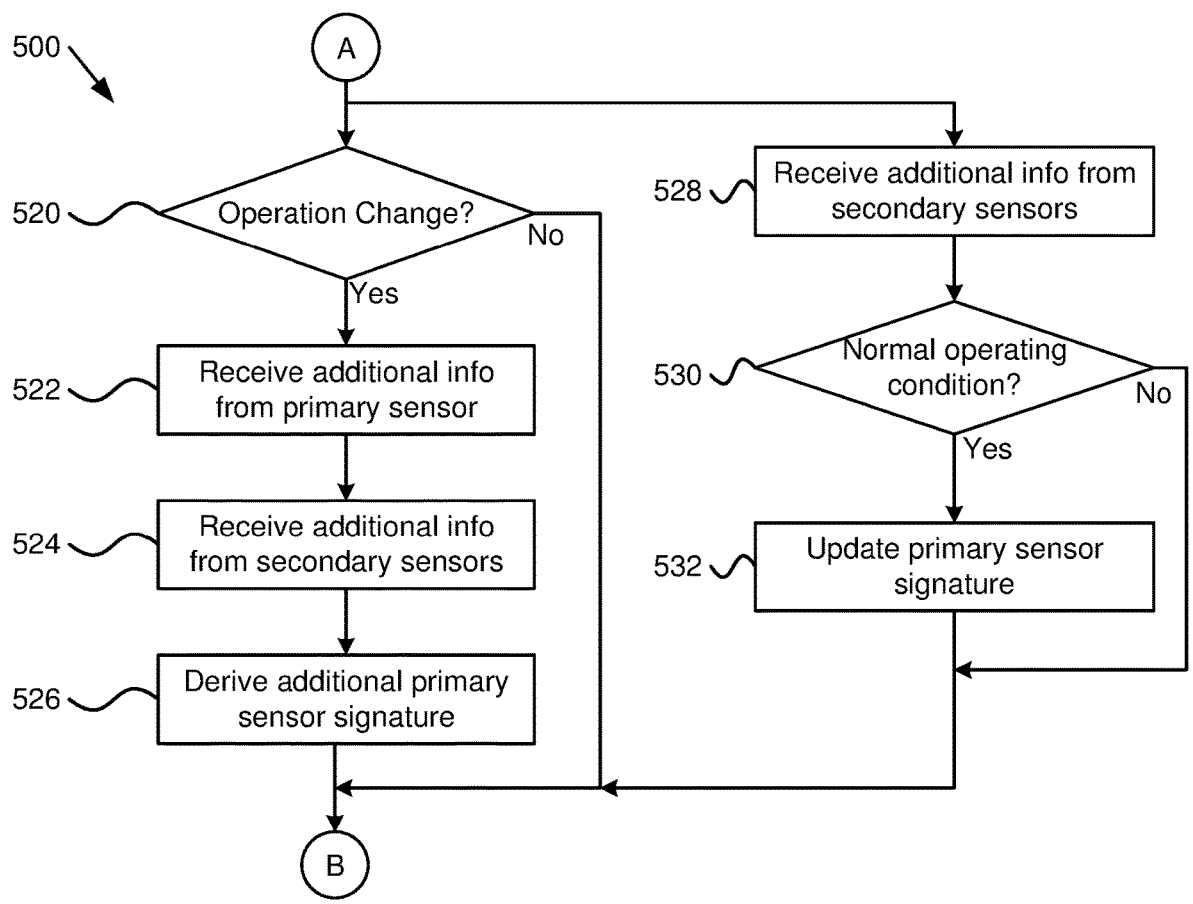
FIG. 5B is a second part of a schematic flowchart diagram of an embodiment of the method for using multiple sensor types to identify a normal operating condition for derivation of a primary sensor signature and using the signature to identify abnormal conditions.

FIG. 5A is a first part and FIG. 5B is a second part of a schematic flowchart diagram of one embodiment of a method 500 for using multiple sensor types to identify a normal operating condition for derivation of a primary sensor signature and using the signature to identify abnormal conditions. The method 500 begins and receives 502 sensor information from a primary sensor where the primary sensor is positioned to receive information from a portion of an industrial operation 130. The method 500 receives 504 sensor information from one or more secondary sensors. One or more of the secondary sensors are arranged to provide additional information about the portion of the industrial operation 130 monitored by the primary sensor indicative of current operating conditions of the portion of the industrial operation 130.

The method 500 determines 506 if a transient is occurring in at least the portion of the industrial operation 130 monitored by the primary sensor. The transient may be a change in operation, a startup, etc., may be a temporary external event affecting the primary sensor, such as vibrations caused by nearby equipment or personnel, or the like. If the method 500 determines 506 that a transient is occurring in the portion of the industrial operation 130 monitored by the primary sensor, the method 500 excludes 508 primary sensor information during the transient and returns to determine 506 if a transient is occurring.

If the method 500 determines 506 that a transient is not occurring in the portion of the industrial operation 130 monitored by the primary sensor, the method 500 determines 510 if the portion of the industrial operation 130 monitored by the primary sensor is operating in a normal condition using the sensor information from the one or more secondary sensors and a machine learning algorithm. If the method 500 determines 510 that the portion of the industrial operation 130 monitored by the primary sensor is not operating in a normal condition, e.g. operating in an abnormal condition, the method 500 returns and receives 502 sensor information from the primary sensor. If the method 500 determines 510 that the portion of the industrial operation 130 monitored by the primary sensor is operating in a normal condition, the method 500 derives 512 a primary sensor signature for the sensor information from the primary sensor using sensor information from the primary sensor during the determined normal operating condition.

The method 500 receives 514 additional sensor information from a primary sensor positioned to receive information from a portion of an industrial operation at least similar to the portion of the industrial operation 130 used to derive the primary sensor signature and determines 516 if the additional sensor information exceeds the primary sensor signature by a threshold amount. The method 500 may perform a FFT or other frequency transformation on the received sensor information before determining 516 if the additional sensor information exceeds the primary sensor signature by a threshold amount and may compare received sensor information with primary sensor signature information at various frequencies.

If the method 500 determines 516 that the additional sensor information exceeds the primary sensor signature by a threshold amount, the method 500 sends 518 an alert, and the method 500 ends. The alert, in various embodiments, includes information about which primary sensor is involved, information identifying a problem identified by the alert, etc. If the method 500 determines 516 that the additional sensor information does not exceed the primary sensor signature by a threshold amount, the method 500 returns and continues to receive 514 sensor information from the primary sensor.

As the method 500 continues to receive 514 information from the primary sensor, the method 500 determines 520 (follow "A" on FIG. 5A to "A" on FIG. 5B) if the sensor information from the secondary sensors is indicative of a change to operation of the portion of the industrial operation 130 monitored by the primary sensor where the change to the operation is an additional normal operating condition. If the method 500 determines 520 that the sensor information from the secondary sensors is indicative of a change to operation of the portion of the industrial operation 130 monitored by the primary sensor indicating the additional normal operating condition, the method 500 receives 522 additional sensor information from the primary sensor during the additional normal operating condition and receives 524 additional sensor information from the secondary sensors during the additional normal operating condition and derives 526 an additional primary sensor signature for the sensor information from the primary sensor without sending an alert of an abnormal operating condition. The method 500 returns (follow "B" on FIG. 5B to "B" on FIG. 5A) and receives 512 sensor information from the primary sensor during an operational mode.

If the method 500 determines 520 that the sensor information from the secondary sensors is not indicative of a change to operation of the portion of the industrial operation 130 monitored by the primary sensor indicating an additional normal operating condition, the method 500 returns (follow "B" on FIG. 5B to "B" on FIG. 5A) and determines 516 if the additional sensor information exceeds the primary sensor signature by a threshold amount.

As the method 500 continues to receive 514 information from the primary sensor, the method 500 also receives 528 (follow "A" on FIG. 5A to "A" on FIG. 5B) additional information from the secondary sensors and determines 530 if the portion of the industrial operation 130 monitored by the primary sensor is operating in a normal condition using the sensor information from the one or more secondary sensors and the machine learning algorithm and updates 532 the primary sensor signature and returns (follow "B" on FIG. 5B to "B" on FIG. 5A) and determines 516 if the additional sensor information exceeds the primary sensor signature by a threshold amount. If the method 500 determines 530 that the portion of the industrial operation 130 monitored by the primary sensor is not operating in a normal condition, the method 500 returns (follow "B" on FIG. 5B to "B" on FIG. 5A) and determines 516 if the additional sensor information exceeds the primary sensor signature by a threshold amount. In various embodiments, the steps of the method 500 are implemented using one or more of the primary sensor module 202, the secondary sensor module 204, the conditions module 206, the signature module 208, the operations module 302, the violation module 304, the alert module 306, the transient exclusion module 308, the update module 310 and the new signature module 312.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
   receiving sensor information from a primary sensor, the primary sensor positioned to receive information from a portion of an industrial operation;
   receiving sensor information from one or more secondary sensors, the one or more secondary sensors are arranged to provide additional information about the portion of the industrial operation monitored by the primary sensor indicative of current operating conditions of the portion of the industrial operation;
   using the sensor information from the one or more secondary sensors and a machine learning algorithm to determine if the portion of the industrial operation is operating in a normal or abnormal condition;
   using the sensor information from the one or more secondary sensors to identify a transient condition and excluding sensor information of the primary sensor during the transient condition; and
   in response to determining that the portion of the industrial operation is operating in a normal condition, using sensor information from the primary sensor during the determined normal operating condition to derive a primary sensor signature for the sensor information from the primary sensor.

2. The method of claim 1, further comprising:
   receiving additional sensor information from one of:
      the primary sensor positioned to receive information from the portion of the industrial operation used to derive the primary sensor signature; and
      another primary sensor positioned to receive information from a portion of an industrial operation similar to the portion of the industrial operation used to derive the primary sensor signature;
   determining if the additional sensor information exceeds the primary sensor signature by a threshold amount; and
   sending an alert in response to determining that the additional sensor information exceeds the primary sensor signature by the threshold amount.

3. The method of claim 2, wherein the primary sensor signature comprises frequency information and determining if the additional sensor information exceeds the primary sensor signature by a threshold amount comprises determining if the additional sensor information at a frequency exceeds the primary sensor signature at the frequency by the threshold amount.

4. The method of claim 2, wherein the portion of the industrial operation at least similar to the portion of the industrial operation used to derive the primary sensor signature is the portion of the industrial operation used to derive the primary sensor signature and the primary sensor used to receive the additional sensor information is the primary sensor used to derive the primary sensor signature.

5. The method of claim 1, wherein the information from the primary sensor comprises a repeating pattern.

6. The method of claim 1, further comprising:
receiving sensor information from the one or more secondary sensors indicative of a change to operation of the portion of the industrial operation monitored by the primary sensor wherein the change to the operation comprises an additional normal operating condition;
receiving additional sensor information from the primary sensor during the additional normal operating condition; and
using the additional sensor information from the primary sensor during the determined additional normal operating condition and using the machine learning algorithm to derive an additional primary sensor signature for the sensor information from the primary sensor without sending an alert of an abnormal operating condition.

7. The method of claim 1, wherein the machine learning algorithm updates the primary sensor signature in response to:
receiving additional sensor information from the primary sensor and receiving additional sensor information from the one or more secondary sensors;
and/or receiving sensor information from a primary sensor and receiving sensor information from one or more secondary sensors positioned to receive information from a portion of an industrial operation at least similar to the portion of the industrial operation used to derive the primary sensor signature.

8. The method of claim 1, wherein the primary sensor comprises one of a vibration sensor, an acoustic sensor, a pressure sensor and a flow sensor.

9. The method of claim 1, wherein:
a secondary sensor of the one or more secondary sensors comprises one of a temperature sensor, a current sensor, a voltage sensor, a camera, a motion sensor, a vibration sensor, an acoustic sensor, a pressure sensor, a flow sensor and information from a programmable logic controller ("PLC");
one or more of the secondary sensors are of a different type than the primary sensor;
one or more of the secondary sensors perform a different function than the primary sensor; and/or
one or more of the secondary sensors comprise a virtual sensor comprising a sensing function based on sensor information from two or more other sensors.

10. A component comprising:
a primary sensor module configured to receive sensor information from a primary sensor, the primary sensor positioned to receive information from a portion of an industrial operation;
a secondary sensor module configured to receive sensor information from one or more secondary sensors, the one or more secondary sensors are arranged to provide additional information about the portion of the industrial operation monitored by the primary sensor indicative of current operating conditions of the portion of the industrial operation;
a conditions module configured to use the sensor information from the one or more secondary sensors and a machine learning algorithm to determine if the portion of the industrial operation is operating in a normal or abnormal condition;
a transient exclusion module configured to use the sensor information from the one or more secondary sensors to identify a transient condition and wherein the signature module is configured to exclude sensor information of the primary sensor during the transient condition; and
a signature module configured to, in response to determining that the portion of the industrial operation is operating in a normal condition, use sensor information from the primary sensor during the determined normal operating condition to derive a primary sensor signature for the sensor information from the primary sensor,
wherein said modules comprise one or more of hardware circuits, a programmable hardware device, and executable code, the executable code stored on one or more computer readable storage media.

11. The component of claim 10, further comprising:
an operations module configured to receive additional sensor information from one of:
the primary sensor positioned to receive information from the portion of the industrial operation used to derive the primary sensor signature; and
another primary sensor positioned to receive information from a portion of an industrial operation similar to the portion of the industrial operation used to derive the primary sensor signature;
a violation module configured to determine if the additional sensor information exceeds the primary sensor signature by a threshold amount; and
an alert module configured to send an alert in response to determining that the additional sensor information exceeds the primary sensor signature by the threshold amount.

12. The component of claim 10, wherein the information from the primary sensor comprises a repeating pattern.

13. The component of claim 10, wherein:
the secondary sensor module is further configured to receive sensor information from the one or more secondary sensors indicative of a change to operation of the portion of the industrial operation monitored by the primary sensor wherein the change to the operation comprises an additional normal operating condition;
the primary sensor module is configured to receive additional sensor information from the primary sensor during the additional normal operating condition; and
a new signature module is configured to use the additional sensor information from the primary sensor during the determined additional normal operating condition and use the machine learning algorithm to derive an additional primary sensor signature for the sensor information from the primary sensor without sending an alert of an abnormal operating condition.

14. The component of claim 10, wherein the primary sensor comprises one of a vibration sensor, an acoustic sensor, a pressure sensor and a flow sensor and wherein:
a secondary sensor of the one or more secondary sensors comprises one of a temperature sensor, a current sensor, a voltage sensor, a camera, a motion sensor, a vibration sensor, an acoustic sensor, a pressure sensor, a flow sensor and information from a programmable logic controller ("PLC");
one or more of the secondary sensors are of a different type than the primary sensor;
one or more of the secondary sensors perform a different function than the primary sensor; and/or
one or more of the secondary sensors comprise a virtual sensor comprising a sensing function based on sensor information from two or more other sensors.

15. A computer program product comprising a computer readable storage medium having program code embodied therein, the program code executable by a processor to:

receive sensor information from a primary sensor, the primary sensor positioned to receive information from a portion of an industrial operation;

receive sensor information from one or more secondary sensors, the one or more secondary sensors are arranged to provide additional information about the portion of the industrial operation monitored by the primary sensor indicative of current operating conditions of the portion of the industrial operation;

use the sensor information from the one or more secondary sensors and a machine learning algorithm to determine if the portion of the industrial operation is operating in a normal or abnormal condition;

using the sensor information from the one or more secondary sensors to identify a transient condition and excluding sensor information of the primary sensor during the transient condition; and in response to determining that the portion of the industrial operation is operating in a normal condition, use sensor information from the primary sensor during the determined normal operating condition to derive a primary sensor signature for the sensor information from the primary sensor.

16. The computer program product of claim 15, wherein the program code is further configured to:

receive additional sensor information from one of:
the primary sensor positioned to receive information from the portion of the industrial operation used to derive the primary sensor signature; and
another primary sensor positioned to receive information from a portion of an industrial operation similar to the portion of the industrial operation used to derive the primary sensor signature;

determine if the additional sensor information exceeds the primary sensor signature by a threshold amount; and send an alert in response to determining that the additional sensor information exceeds the primary sensor signature by the threshold amount.

17. The computer program product of claim 15, wherein the information from the primary sensor comprises a repeating pattern.

18. The computer program product of claim 15, wherein the program code is further configured to:

receive information from the one or more secondary sensors indicative of a change to operation of the portion of the industrial operation during wherein the change to the operation comprises an additional normal operating condition;

receive additional sensor information from the primary sensor during the additional normal operating condition; and use the additional sensor information from the primary sensor during the determined additional normal operating condition and use the machine learning algorithm to derive an additional primary sensor signature for the sensor information from the primary sensor without sending an alert of an abnormal operating condition.

\* \* \* \* \*